United States Patent [19]

Schumacher

[11] Patent Number: 6,122,039
[45] Date of Patent: Sep. 19, 2000

[54] METHOD AND APPARATUS TO DETECT AND REPORT OBJECT DISPLACEMENT UTILIZING OPTICAL TRIANGULATION PRINCIPLES

[75] Inventor: Neal A. Schumacher, Golden Valley, Minn.

[73] Assignee: Banner Engineering Corp., Minneapolis, Minn.

[21] Appl. No.: 09/181,196

[22] Filed: Oct. 28, 1998

[51] Int. Cl.[7] .............................. G01C 3/00; G02B 7/04; G03B 13/00
[52] U.S. Cl. ................. 356/3.07; 250/201.6; 396/106
[58] Field of Search ........................ 356/3.01–3.16; 250/201.6; 396/106

[56] References Cited

U.S. PATENT DOCUMENTS

| | | |
|---|---|---|
| 4,522,492 | 6/1985 | Masunaga . |
| 4,558,313 | 12/1985 | Garwin et al. . |
| 4,674,855 | 6/1987 | Utagawa . |
| 4,701,049 | 10/1987 | Beckmann et al. . |
| 4,761,546 | 8/1988 | Ikari et al. . |
| 4,774,403 | 9/1988 | Arts . |
| 4,864,147 | 9/1989 | Ikari et al. . |
| 5,055,664 | 10/1991 | Ryczek . |
| 5,113,080 | 5/1992 | Leu et al. ................................ 250/561 |
| 5,210,585 | 5/1993 | Suzuki . |
| 5,923,427 | 7/1999 | Dong ..................................... 356/375 |

FOREIGN PATENT DOCUMENTS

| | | |
|---|---|---|
| 31 10 644 A1 | 2/1982 | Germany . |
| 57-44809 | 3/1982 | Japan . |
| 64-31412 | 1/1989 | Japan . |

OTHER PUBLICATIONS

Co–pending U.S. Patent application Ser. No. 08/889,997, filed Jul. 10, 1997 (18 pgs).
"DRS™ Digital Range Sensor", CyberOptics Corporation, Minneapolis, MN, Feb. 1998; 4 pgs.
"IDEC Self–Contained Laser Displacement Sensors—MXIC", Idec (date unknown); 4 pgs.
"Laser Analog Displacement Sensor—LAS–2010/LAS–2010V", Adsens Tech., Inc., La Puente, CA 91744, Jul. 1993 (4 pgs).
"Laser–Based Linear Displacement Photoelectric Sensor", *Sensors*, Jul. 1988; ©Helmers Publishing, Inc., Peterborough, NH 03458; 2 pgs.
"OMRON—Laser Displacement Sensor—Z4M–WR", Omron (date unknown); 10 pgs.
"Position–Sensitive Detectors" (source and date unknown); 5 pgs.
"Sensing Automobile Occupant Position with Optical Triangulation", by W. Chapelle, *Sensors*, Dec. 1995; 5 pgs.

*Primary Examiner*—Stephen C. Buczinski
*Attorney, Agent, or Firm*—Merchant & Gould P.C.

[57] ABSTRACT

A object displacement measuring system and utilizing optical triangulation techniques is constructed to determine the displacement of an object between a near and far sensing limits. In constructing the system to determine the object displacement relative to these sensing points, the mathematical calculations needed to determine the controlling transfer function are simplified. In alternate embodiments, the object displacement is measured relative to a measurement window having a fixed width and a known mid-point. With the use of the transfer function resulting from the use of either coordinate systems, an output signal generated by a digital-to-analog converter can be controlled digitally to set the gain and offset values of the output signal rather than adjusting these values using analog circuitry.

45 Claims, 11 Drawing Sheets

METHOD AND APPARATUS TO DETECT AND REPORT OBJECT DISPLACEMENT UTILIZING OPTICAL TRIANGULATION PRINCIPLES

BACKGROUND OF THE INVENTION

1. Field of the Invention

This invention relates in general to a method to detect and report object displacement utilizing optical triangulation principles, and more particularly to a method and apparatus to detect and report object displacement within a fixed displacement window defined by a minimum and maximum displacement or within a window having a fixed size about a midpoint.

2. Description of Related Art

It can be seen that there is a need for a method and apparatus for determining the displacement of an object which possesses a linear relationship between a pair of user defined minimum and maximum points of displacement.

It can also be seen that there is a need for a method and apparatus for determining the displacement of an object which can be easily computed while providing a method for controlling the output signal generated in response to the measurement of the object displacement.

A pictorial overview of a system for optically determining object displacement is illustrated in FIG. 1. As shown in FIG. 1, the sensor is a device based on optical triangulation. A light emitting element 101, such as a laser diode, light emitting diode, or similar device, transmits light in the direction of motion in which the object's relative position is to be gauged. A conditioning element 102, such as a lens, can be used to focus the light from the source to enhance the performance of measuring device. The light from the emitter interacts with the target 103, which in turn scatters a small portion of the light in the direction of the receiving element 104, such as a CCD array, PSD, or other linear detection array element. A single lens or lens system 105 may be used to enhance the collection of the light scattered from the target to increase the performance of the device. The information generated by the receiving element is conditioned with analog 106 and digital electronics 107 and is used to calculate the position of the light on the receiving element. This generated information is then used to calculate an output which is linearly proportional to the target's position within a set of sensing limits, called the Minimum Sensing Distance 110 and the Maximum Sensing Distance 111.

Existing implementations of displacement systems in this sensing area can be characterized primarily into two areas: 1) the type of transfer function used to map the position of a target from information generated by the receiving element, and 2) the implementation of the transfer function. Primarily, designs of these existing systems provide an absolute distance measurement, an output proportional to a fixed sensing range, or an output proportional to a fixed sensing range with limited electronically implemented adjustment to the scale of the analog output which provides slight adjustments in the slope or intercept of the output.

Optical displacement sensors based on the established principle of triangulation have been sold commercially for many years. What distinguishes displacement sensors from discrete output sensors based on triangulation, which are referred to as adjustable field (or AF) or fixed field sensors, is a displacement sensor's ability to provide an analog output that is ideally linearly proportionate to the sensing distance. Examples of some of these types of sensors would be those manufactured by Keyence Corp. (LB70, LB1000, and LC series), Aromat Corp. (ANR, LM100/200, and LM 300 series), DynaVision™ (LDS and LTS series, Omron (Z4M series), Idec (MX1 series), and CyberOptics (DRS series). The outputs of these systems are primarily a value proportional to the target distance. Some of the systems (as with CyberOptics DRS series) output absolute distance from a reference point. For most of the other systems, an analog voltage or current is produced that allows users to indirectly measure the distance based on the sensor's known operating range. Several of the systems also provide for trimming the analog outputs using potentiometers or pushbuttons. This output trimming process is used to adjust the scale or offset of the output.

In a basic sense, all of the aforementioned sensors operate upon one principle; as a target in the sensor's field of view moves, it's image on a receiving element also moves. If an appropriate receiving element is used, for example a lateral effect photo-diode (PSD) or a linear CCD array, the change in position can be quantified and converted into an ideally linear analog output over the operating range of the sensor. This relationship is shown in FIGS. 2–4. In FIG. 2, the target moves from position A 201 to position B 202 and finally to position C 203. Assume that the distance the target moves from position A 201 to position B 202 is the same as the distance moved from position B 202 to position C 203. The light from an emitter element 210 is directed through a conditioning lens 211 or lens system toward the target. A small amount of light scattered from the target is imaged on the receiving element 212 through a lens 213. As the target moves from position A 201 to position B 202 to position C 203, the position of the image on the receiving element also moves. This movement across the receiving element is non-linear with respect to the distance the target travels as depicted in FIG. 3. This non-linear displacement relationship must be processed through a linearization process to create an output that is linearly proportional to the distance traveled as depicted in FIG. 4.

Linearization Techniques

The technique, and corresponding side affects, to implement the linearization process is the primary distinguishing characteristic of the present invention as compared to the current state of the art. Typically, one of three approaches is used for linearizing the output of triangulation based displacement sensors: 1) linearize the output signal through some configuration of electrical circuits, 2) linearize the output signal through the use of look-up tables that directly "store" image position data as a function of target distance, or 3) linearize the output signal through an appropriate transfer functions derived from the fundamental geometric relationships of the sensor.

1) Linearize With Electrical Circuits

One particular technique for dealing with the inherent non-linearities of a triangulation based sensors is to use electrical circuits to linearize the output over a pre-defined working range as disclosed in U.S. Pat. No. 4,761,546 issued to Ikari, et al. These types of techniques are inherently more susceptible to temperature effects, and thus requiring more circuitry to compensate for these undesirable effects, as well as are more difficult to achieve a high degree of output linearity over a large range of target motion.

2) Look-Up Tables

Another technique of dealing with the non-linear nature of triangulation based measurements is to do a point by point calibration of the system and then storing the position of the image on the receiving element for each associated sensing distance in look up table. As the target is moved within the sensing region, the output is adjusted according to the data stored in the look up table. Systems using this technique are described in U.S. Pat. No. 4,705,395 issued to Hageniers and U.S. Pat. No. 4,774,403 issued to Arts.

Systems that linearize based on a look-up table calibration can provide a high degree of linearity on the output. However, in order to achieve this high degree of resolution, a large quantity of measurements must be taken and subsequently stored. This is not efficient from a manufacturing aspect or when required to implement this approach in a real-time operating system. In addition, displacement information for positions not calibrated must be numerically interpolated which can be computationally intensive to make accurate.

3) Linearize Through an Transfer Function Defining the Geometry of the System

Several approaches have been proposed using a transfer function, which includes a direct system of governing equations, to linearize the output from the receiving element. These systems include those disclosed in U.S. Pat. No. 4,761,546 and U.S. Pat. No. 5,113,080 issued to Leu, et al. In the case of the former, the system is linearized for a specific geometrical configuration. The latter uses an exact system of equations based on a more arbitrary geometric configuration. The system of equations disclosed in Leu, et al. are derived with the intent to measure absolute displacement which is reflected in the form of the primary transfer function. In addition, calibrating the transfer function, as disclosed by this reference, relies on direct measurements of several important optical parameters. While the author claims that these parameters "can easily be measured"; in practice, this is almost certainly not the case.

The present invention attempts to overcome the deficiencies of the prior art as described above in the following manner. The invention provides an output which is ideally linearly proportional to a target's position within a set of user defined sensing limits. This feature is a significant improvement over other optical triangulation devices of similar design. The transfer function used to calculate the relative position of the target with respect the user defined sensing limits is of a form that allows it to be efficiently implemented within a microprocessor. The form of this function is unique when compared to inventions of similar function. The linearity of the transfer function over the user defined set of sensing limits can be maximized by adjusting a single constant. This provides for significant improvement over other inventions of similar design.

SUMMARY OF THE INVENTION

To overcome the limitations in the prior art described above, and to overcome other limitations that will become apparent upon reading and understanding the present specification, the present invention discloses an object displacement measurement system which utilizes triangulation that generates an displacement measurement for a target relative to a near and user configurable far sensing limits.

A system in accordance with the principles of the present invention includes a system which generates a beam of light by a light source which is focused by a lens onto a target object. The object is located at a position X 1104 which is between a near sensing limit 1103 and a far sensing limit 1105. The light beam is scattered by the target with a portion of the scattered light being received and focused by a receiving lens 1110 onto a receiving device. The image of the target on receiving device will be located at an image position Z 1112 between image position Zn 1113 and image position Zf 1111 which correspond to the image positions for the near and far sensing limits respectively.

The receiving device generates output signals which represent the object image position on the receiving device. These signals correspond to the position of the target image relative to each end of the receiving device in the Z axis. The output signals are amplified to generate a first and second position signal, V1 and V2 respectively. These two signals are then sampled by a first and second A-to-D converter.

The digital representations of the position signals V1 and V2 are read by a conventional microcontroller. The microcontroller 1130 uses these position signals to calculate the target displacement using the transfer functions. The microcontroller also interfaces with various user interface devices as well as also controls the operation of the light source.

In this example embodiment of the present invention, the microcontroller interfaces with a D-to-A converter which generates an output voltage signal and an output current signal using an output voltage buffer circuit and output current boost circuit respectively. These output signals represent the target position between the near and far sensing limit.

Other embodiments of a system in accordance with the principles of the invention may include alternative or optional additional aspects. One such aspect of the present invention is that the transfer function can possess either a positive or a negative slope where the target position is reported relative to the positions of the near and far sensing limits.

Another aspect of the present invention is that the near and far sensing limits which define the normalized coordinate system can be defined in terms of a fixed window size located about a mid-point.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

According to an example embodiment of the present invention, the present invention provides a method and apparatus for determining an object displacement using optical measurements based upon triangulation principles. The motivating factors for the present invention was to make a system that could:

1) Be easily linearized;
2) Provide a greater degree of flexibility for the user; and
3) Provide for a system that could be efficiently implemented with low-cost electrical and processing components.

The primary mechanism by which these goals were met was by developing a system that relies on a governing set of equations designed for quantifying the position of a target relative to two known positions without having to know absolute distance.

Although the geometry which controls the operation of the present invention is similar to that disclosed in prior art in that the geometry is defined by well known triangulation principles, the coordinate system utilized by the present invention is specified uniquely. Using basic trigonometric relationships, the following transfer function can be defined to relate the target displacement, X 501, with the measured image position, Z 502.

$$X = \frac{Y_L |X_L| / \mathrm{Sin}\phi}{(Z - Z_L)} + Y_L \mathrm{Cot}\phi \quad \text{Equation 1}$$

Equation 1 is an exact non-linear mapping of the displacement in the X-direction to the displacement in the Z-direction. The form of Equation 1 is more robust than those demonstrated in prior art in part due to the fact that the measured position of the image on the receiving element (Z), is present in only one location within the equation due to the choice of the coordinate system of the present invention.

Figure 1:
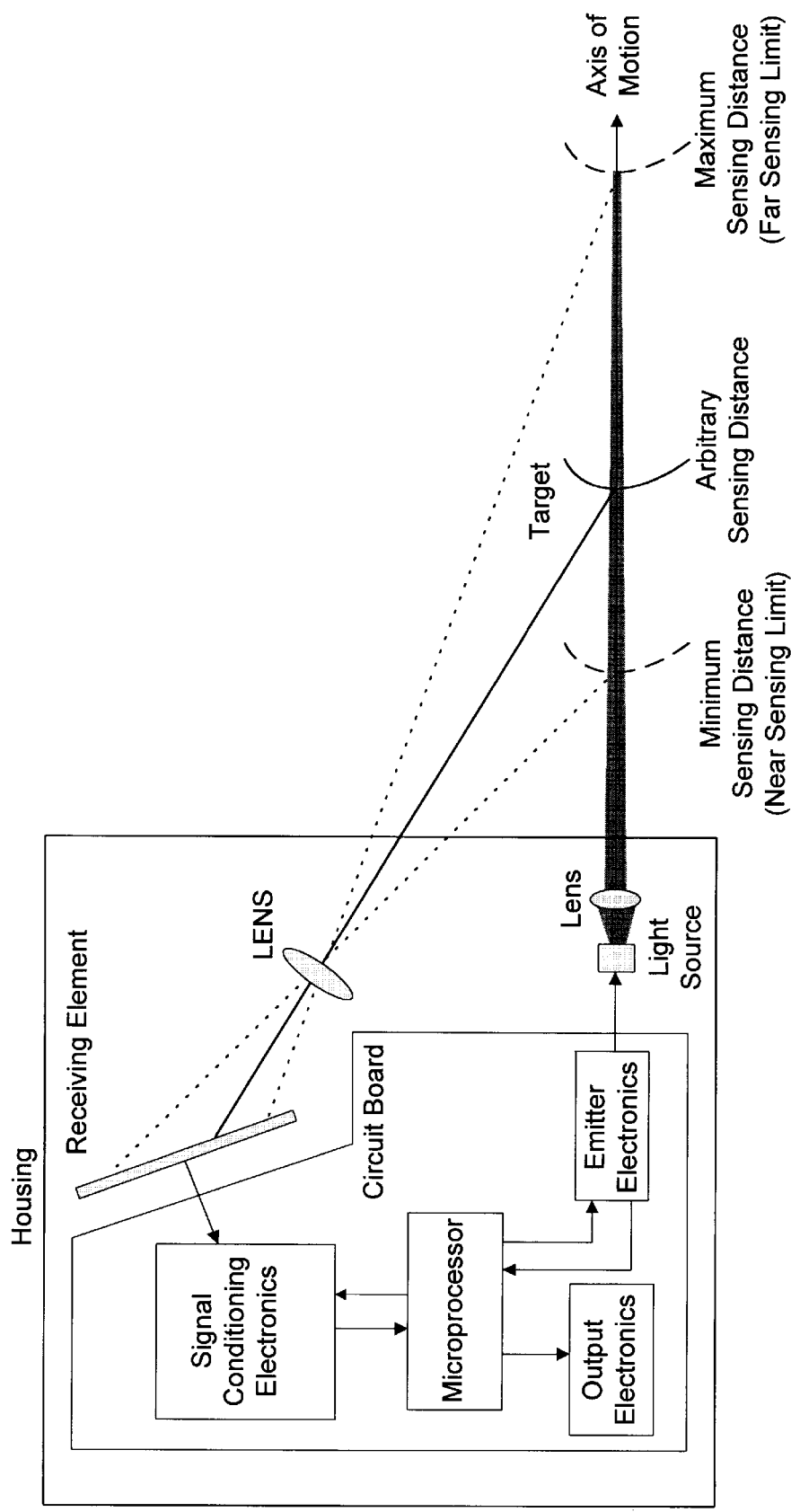
FIG. 1 illustrates an object displacement measurement system which utilizes trangulation principles according to the present invention.
Figure 2:
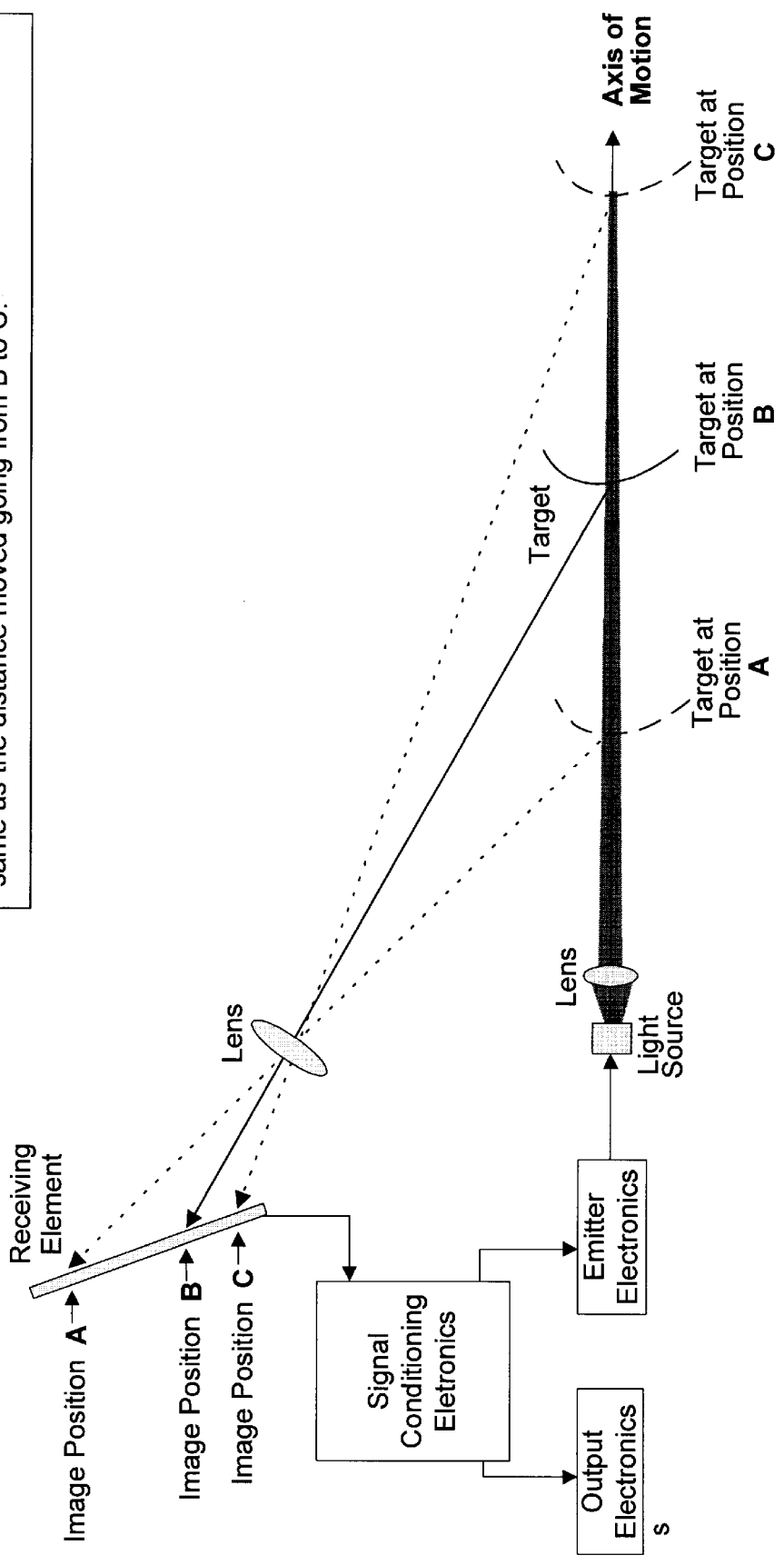
FIG. 2 illustrates the process of object displacement measurement utilizing trangulation principles according to the present invention.
Figure 3:
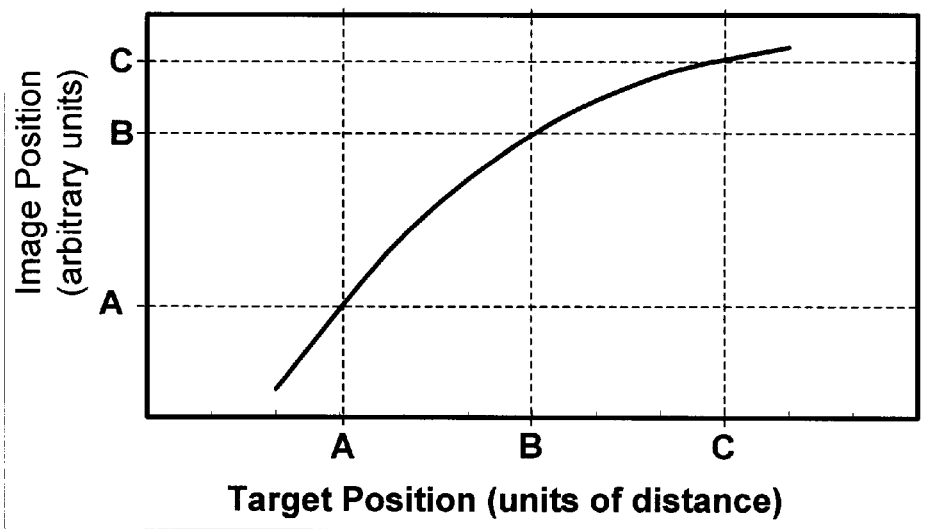
FIG. 3 illustrates the relationship between a target position being measured as compared to the measured position on a receiving device of an object displacement measurement system which utilizes trangulation principles according to the present invention.
Figure 4:
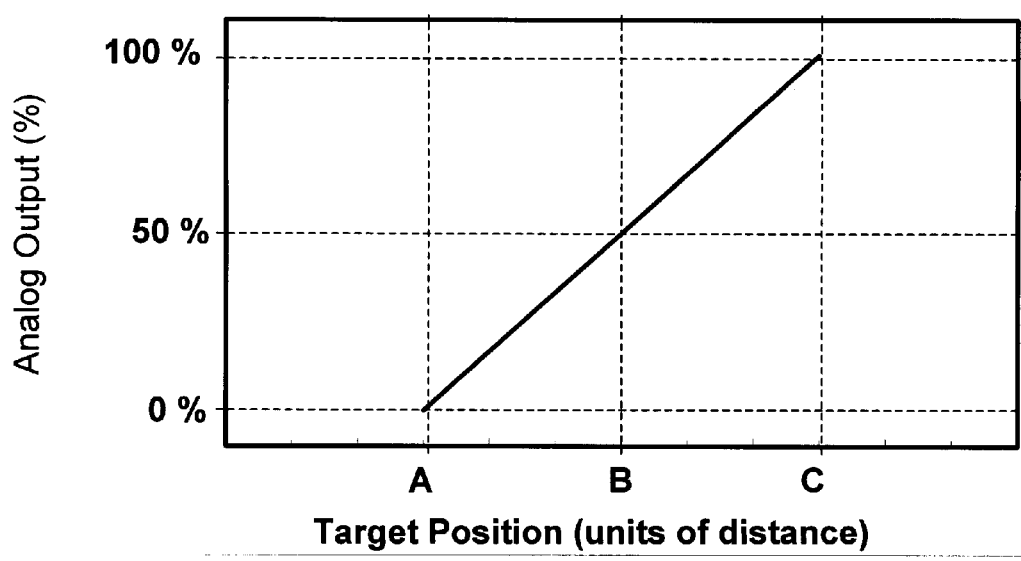
FIG. 4 illustrates the desired relationship between a target position being measured as compared to the output signal generated by an object displacement measurement system which utilizes trangulation principles according to the present invention.

Of particular use to a user of a object displacement measurement system, is the ability to track the location of a target relative to two "known" positions that are defined by that user. For example, in FIG. 2, the end user may wish to "teach" the sensors positions A 201 and position C 203. The output would ideally then be proportional to the position of the target relative to the distance prescribed by target locations A and C. If this is considered, then the following transfer function can be found:

$$\mathrm{OUTPUT} = \frac{\frac{1}{(Z - ZL)} - \frac{1}{(Za - ZL)}}{\frac{1}{(Zc - ZL)} - \frac{1}{(Za - ZL)}} \quad \text{Equation 2}$$

where

Z=any arbitrary measured position on the receiving element

ZL=a calibration constant

Za=the measured position on the receiving element for the target at position A

Zc=the measured position on the receiving element for the target at position C and the numeric value of OUTPUT is:

OUTPUT=0.0 when Z=Za (target at position A)

OUTPUT=1.0 when Z=Zc (target at position C)

OUTPUT=0.5 when Z=(Za+Zc)/2 (target is half way between positions A&C)

In other words, the output of the transfer function directly indicates the position of the target relative the user's desired sensing limits rather than limits that are factory calibrated. The form of Equation 2 is such that the function OUTPUT increases as the targets position moves closer to position C. Also note from Equation 2, the function OUTPUT is dimensionless and thus not dependent on absolute distance.

It is possible to adjust the transfer function in such a way that the function decreases as the target moves from position A to position C. This simple change can provide a significant benefit to the user in various circumstances. The form of that equation is:

$$\mathrm{OUTPUT} = \frac{\frac{1}{(Zc - ZL)} - \frac{1}{(Z - ZL)}}{\frac{1}{(Zc - ZL)} - \frac{1}{(Za - ZL)}} \quad \text{Equation 3}$$

where

Z=any arbitrary measured position on the receiving element

ZL=a calibration constant

Za=the measured position on the receiving element for the target at position A

Zc=the measured position on the receiving element for the target at position B and the numeric value of OUTPUT is:

OUTPUT=1.0 when Z=Za (target at position A)

OUTPUT=0 when Z=Zc (target at position C)

OUTPUT=0.5 when Z=(Za+Zc)/2 (target is half way between positions A&C).

The form of Equations 2 and 3 are such that only a single constant (the variable ZL) is needed to linearize the output. The value for the constant ZL can be theoretical deduced from the system geometry. However, it can also be optimized, and thus altered from its theoretical value, to better linearize the output of the sensor. This allows for the system to readily optimized in factory for the best overall linearity of the analog output. This is of significant advantage over prior systems.

The values for Za and Zc in Equations 2 and 3 are directly measured from the receiving element when the sensing range of the device is programmed by the user The measurements can be made either in the factory or in the field.

This characteristic of the present invention is of considerable advantage to an end user by providing a simple, robust way to scale the analog output over their desired working range. Hence any scaling on the analog output can now efficiently be implemented through algorithmic means and without the need to adjust the analog output electrical components. Again, this makes the sensor more versatile and practical for our end users.

Transfer Function and Calibrating Derivations

Figure 5:
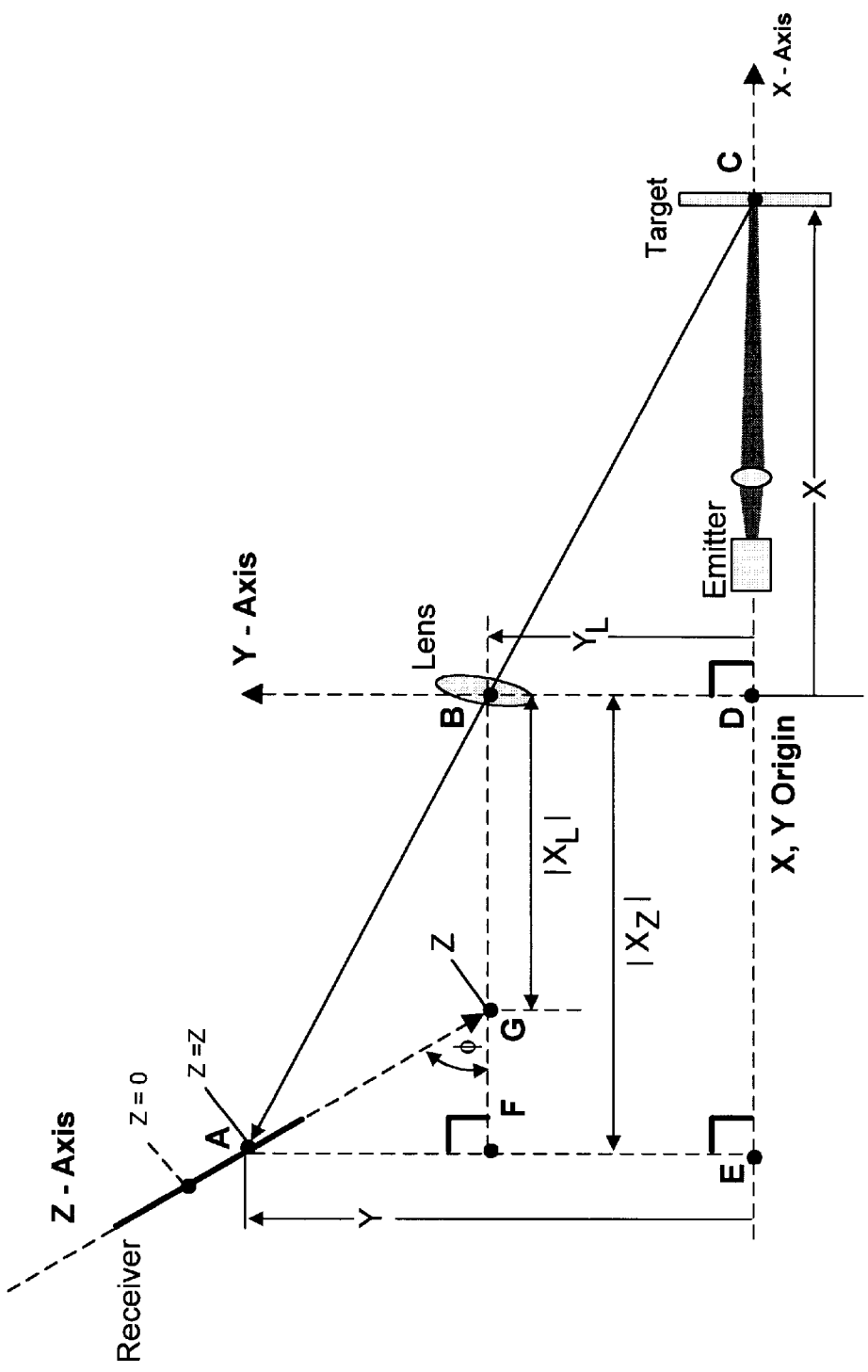
FIG. 5 illustrates the geometry utilized by an object displacement measurement system which utilizes trangulation principles according to the present invention.

FIG. 5 is the geometrical information for the case of an arbitrary offset angle on the PSD. From sole geometrical considerations, it is possible to develop the transfer functions to map the displacements in the x-direction to a measured displacement in the z-direction. With this geometry, it is assumed (but not required) that plane of the x-axis lies along the central axis of the laser diode and the y-axis lies normal to the x-axis, passing through the lens' "effective" axis of rotation. The variable Z is used to map position in the plane of the PSD.

Define the following constants:

X=arbitrary location on the x-axis, 501

Z=position on the z-axis corresponding to a given position (X) on the x-axis, 502

$Z_L$=position on the z-axis where the receiving element intersects the horizontal plane of the lens, 503

$|X_L|$=distance (in the negative X-direction) from lens to the intersection z-axis, 504

$Y_L$=distance lens is offset from laser diode (x-axis), 505

$|X_Z|$=distance (in the negative X-direction) from lens to some arbitrary position on the PSD (Z), 506

$Y_Z$=vertical offset from laser diode for some arbitrary position on the PSD (Z), 507.

Θ=angle of a ray relative to the x-axis that passes "straight" through the lens to PSD, 508

φ=angle of the PSD, 509

The derivation of the transfer function begins with the fundamental trigonometric relationships defined in FIG. 5:

$$\text{Tan}\theta = \frac{Y_L}{X}, \qquad \text{Equation 4}$$

$$\text{Tan}\theta = \frac{(Y_Z - Y_L)}{|X_Z|}, \qquad \text{Equation 5}$$

and $$\text{Sin}\phi = \frac{(Y_Z - Y_L)}{(Z - Z_L)}. \qquad \text{Equation 6}$$

Setting Equations 4 and 5 equal leads to:

$$(Y_Z - Y_L) = \frac{|X_Z|Y_L}{X}. \qquad \text{Equation 7}$$

Now, solving for $(Y_Z-Y_L)$ in Equation 6 and substituting it into Equation 7 and solving for $(Z-Z_L)$ leads to:

$$(Z - Z_L) = \frac{|X_Z|Y_L}{X\text{Sin}\phi}. \qquad \text{Equation 8}$$

which leads to:

$$|X_Z|=(Z-Z_L)\text{Cos }\phi+|X_L|. \qquad \text{Equation 9}$$

Substituting Equation 9 into Equation 8 leads to:

$$(Z - Z_L) = \frac{Y_L|X_L|}{(X\text{Sin}\phi - Y_L\text{Cos}\phi)} \qquad \text{Equation 10}$$

or in terms of X as a function of Z, $$X = \frac{Y_L|X_L|/\text{Sin}\phi}{(Z - Z_L)} + Y_L\text{Cot}\phi \qquad \text{Equation 11}$$

As shown in Equation 11, calculating the targets position depends on knowing several quantities: 1) $Y_L$ 505—the distance from the central axis of the laser diode to the axis of rotation of the lens and 2) $|X_L|$504—the distance from the receiving lens to the plane of the PSD (in the minus X-direction), 3)φ509, the angle of the PSD and 4) $Z_L$ 503,—the value of Z at the intersection of the plane of the PSD with the horizontal plane of the lens. If the goal were to give absolute displacement as a function of a measured value on the PSD, then all these quantities would need to be known exactly. However, the present invention does not attempt to make an absolute displacement measurement. The present invention utilizes a transfer function that will linearize the analog output over the user defined window limits, $X_N$ and $X_F$.

Figure 6:
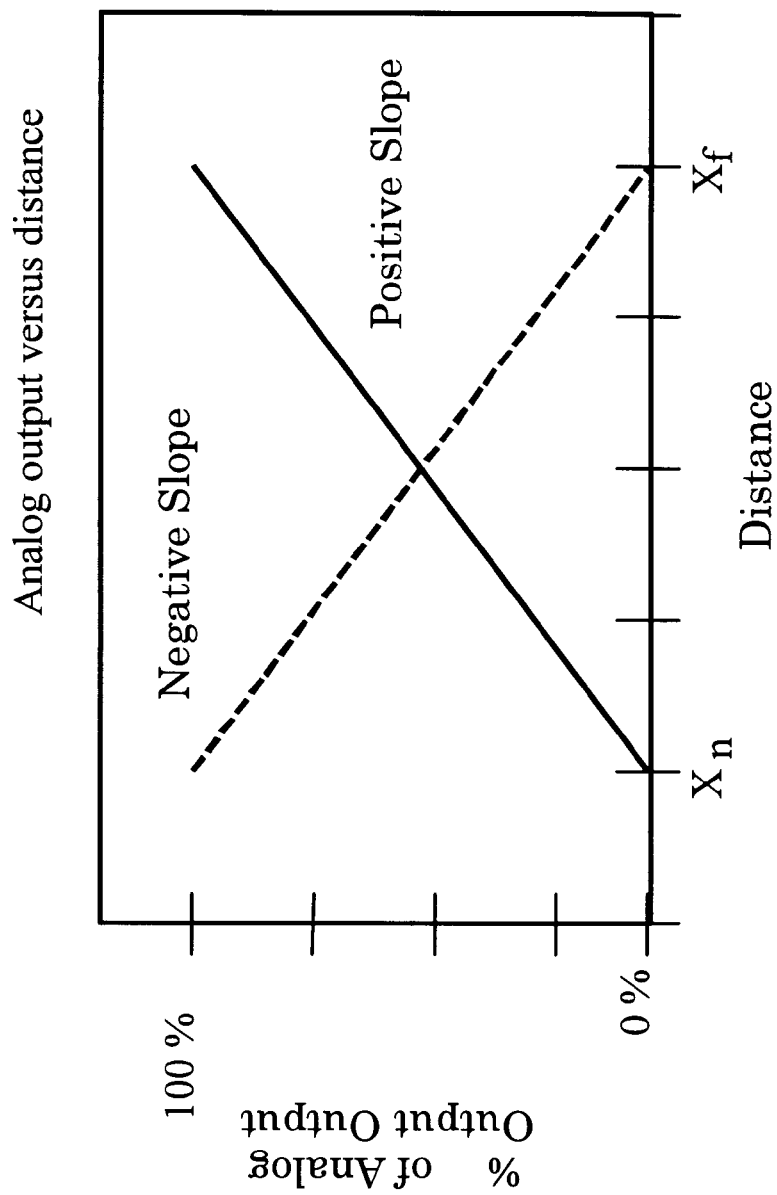
FIG. 6 illustrates the desired relationship between a target position being measured as compared to the output signal generated by an object displacement measurement system which possess both a positive and a negative slope transfer function according to the present invention.

As with any analog unit, one of two outputs is possible: 1) the output is at a minimum at the near window limit and increases as the target approaches the far window limit or 2) the output is a maximum when the target at the near window limit and decreases to a minimum when target is at the far window limit. This is shown graphically in FIG. 6. For each output case, a simple output relationship exists:

Positive Slope

For this case, the analog output (on a scale of 0 to 1) can be written:

$$A\_out = \frac{(X - X_n)}{(X_f - X_n)} \qquad \text{Equation 12}$$

At $X=X_n$, A_out=0 and at $X=X_f$, A_out=1. Now, substitute from Equation 11 the appropriate expressions for X, $X_n$, and $X_f$ in terms of the measured position in the receiver's plane (Z) into Equation 13 and simplify. This leads to:

$$A\_out_+ = \frac{\frac{1}{(Z - Z_L)} - \frac{1}{(Z_N - Z_L)}}{\frac{1}{(Z_F - Z_L)} - \frac{1}{(Z_N - Z_L)}} \qquad \text{Equation 13}$$

$Z_N$ and $Z_F$ are the receiver's measured values for the near and far window limits, respectively with $Z_L$ representing a constant that can be used to ideally linearize the transfer function.

Negative Slope

For the negative slope case, the analog output (on a scale of 1 to 0) can be written:

$$A\_out- = \frac{(X_f - X)}{(X_f - X_n)} \qquad \text{Equation 14}$$

Note, at $X=X_n$, A_out=1 and at $X=X_f$, A_out=0. Now, substitute from Equation 11 the appropriate expressions for X, $X_n$, and $X_f$ in terms of the measured position in the receiver's plane (Y) into Equation 14 and simplify. This leads to:

$$A\_out- = \frac{\frac{1}{(Z_F - Z_L)} - \frac{1}{(Z - Z_L)}}{\frac{1}{(Z_F - Z_L)} - \frac{1}{(Z_N - Z_L)}} \quad \text{Equation 15}$$

It is important to note from Equations 14 and 16 is that the linearized analog output only depends on 4 values:

1) Measured value of the current target position (Z);
2) Measured value for the far limit ($Z_F$);
3) Measured value for the near limit ($Z_N$); and
4) The optimization value ($Z_L$)—the position the receiver would record if it intersected the horizontal plane of the lens.

The output is not, however, dependent on absolute distance and is easily scaled during normal operation to the near and far window limits established by the user.

Optimizing the Linearity of the transfer Function

In order to effectively utilize the transfer functions of the present invention, the transfer functions must be optimized to provide an output having as linear an output as possible. This optimization is performed as follows. Again, referring to FIGS. 5 and 6, define the following constants:

X=arbitrary location on the x-axis
Z=measured position in the Z-direction corresponding to a given position (X) on the x-axis
$Z_L$=point of intersection between the plane of the PSD and the lens axis
$X_N$=near range sensing limit
$Z_N$=measured position on the receiving element for the near range sensing limit
$X_F$=far range sensing limit
$Z_F$=measured position on the receiving element for the far range sensing limit Positive Slope The ideally linear transfer function for a positive going slope (whose value increases with sensing distance) is given by Equation 16.

$$A_{Out+} = \frac{\frac{1}{(Z - Z_L)} - \frac{1}{(Z_N - Z_L)}}{\frac{1}{(Z_F - Z_L)} - \frac{1}{(Z_N - Z_L)}} \quad \text{Equation 16}$$

where $A_{Out+} = 0.0$ for $Z = Z_N$
(when target is at near
range sensing limit, $X_N$)

$A_{Out+} = 0.5$ when target is at mid range
sensing position, $(X_N + X_F)/2$ $A_{Out+} = 1.0$ for $Z = Z_N$
(when target is at far range
sensing limit, $X_F$)

Negative Slope

The ideally linear transfer function for a negative going slope (whose value decreases with sensing distance) is given by Equation 17.

$$A_{Out-} = \frac{\frac{1}{(Z_F - Z_L)} - \frac{1}{(Z - Z_L)}}{\frac{1}{(Z_F - Z_L)} - \frac{1}{(Z_N - Z_L)}} \quad \text{Equation 17}$$

where $A_{Out-} = 1.0$ for $Z = Z_N$
(when target is at near
range sensing limit, $X_N$)

$A_{Out-} = 0.5$ when target is at mid range
sensing position, $(X_N + X_F)/2$ $A_{Out-} = 0.0$ for $Z = Z_N$
(when target is at far range
sensing limit, $X_F$).

The calibration of the transfer function involves determining the "best" $Z_L$ for a given system. "Best", in this case, means the value of $Z_L$ that provides for the highest degree of linearity to the transfer function—not the $Z_L$ that most closely matches the "ideal" $Z_L$ based on the mechanical dimensions of the system. In other words, $Z_L$ can be adjusted to minimize the linearity errors introduced through the various elements of the system.

It is important to note that in Equations 16 and 17, that the output values of the transfer functions depend only on measured values from the receiving element and one additional constant, $Z_L$. If the near and far range limits ($Z_N$ and $Z_F$) are measured directly from the receiving element, $Z_L$ is the only constant that needs to be adjusted to optimize the linearity. From this point on, a linearity optimization scheme is presented that takes advantage of the unique nature of the transfer function. This scheme will be presented for the positive going slope, Equation 16, but it is straightforward to show that the same scheme is valid for the negative going slope, Equation 17.

In general, it is very difficult to accurately say that a target is a certain distance from the face of the sensor since there are natural variations in the sensor's mounting holes and overall dimensions. However, it is far easier to move a target a fixed distance and accurately measure how far it has moved. Recall that Equation 16 represents the output from a transfer function that indicates the position of a target (on a 0 to 1 scale) between two known sensing window limits.

A suitable optimization procedure can be summarized as follows:

1. Accurately teach the sensor a finite number of positions relative to the near and far range limits over which the sensor is to operate (for example, say 11 positions)
   Position 1 minimum sensing range (0% of range extremes)
   Position 2 minimum sensing distance+10.0% of the total span
   Position 3 minimum sensing distance+20.0% of the total span etc.
   Position 10 minimum sensing distance+90.0% of the total span
   Position 11 minimum sensing distance+100.0% of the total span The accuracy required in the above process needs to be in the positioning of the individual targets within the overall sensing span, not the positioning of any one target relative to the sensor.

2. Based on the measured values at the PSD from the series of calibration positions, determine the value of $Z_L$ that most linearizes the output over the sensing range. A way of doing this optimization would be through a least squares minimization routine as demonstrated in Equation 18.

$$\text{Sum Square Error} = \sum_i \hat{A} \left[ WL_i - \frac{\frac{1}{(Z_i - Z_L^*)} - \frac{1}{(Z_N - Z_L^*)}}{\frac{1}{(Z_F - Z_L^*)} - \frac{1}{(Z_N - Z_L^*)}} \times 100 \right]^2. \quad \text{Equation 18}$$

Where:

$Z_L^*$ = trial or "guess" value for $Z_L$.

$Z_N$ = measured position (in the receiver's frame of reference) for the near range sensing position.

$Z_F$ = measured position (in the receiver's frame of reference) for the far range sensing position.

$WL_i$ = 0, 10, 20, ... 90, 100 (for the sensing positions defined in part 1).

As an example, Table 1 shows a set of typical data for linearization.

TABLE 1

Measured values of the target's image position on the receiving element.

| % of Window Limit | Measured Position on Receiving Element (Z) |
|---|---|
| 0.00% ($Z_N$) | −0.3266 |
| 10.00% | −0.2510 |
| 20.00% | −0.1782 |
| 30.00% | −0.1086 |
| 40.00% | −0.0420 |
| 50.00% | 0.0217 |
| 60.00% | 0.0835 |
| 70.00% | 0.1420 |
| 80.00% | 0.2001 |
| 90.00% | 0.2546 |
| 100.00% ($Z_F$) | 0.3068 |

Figure 7:
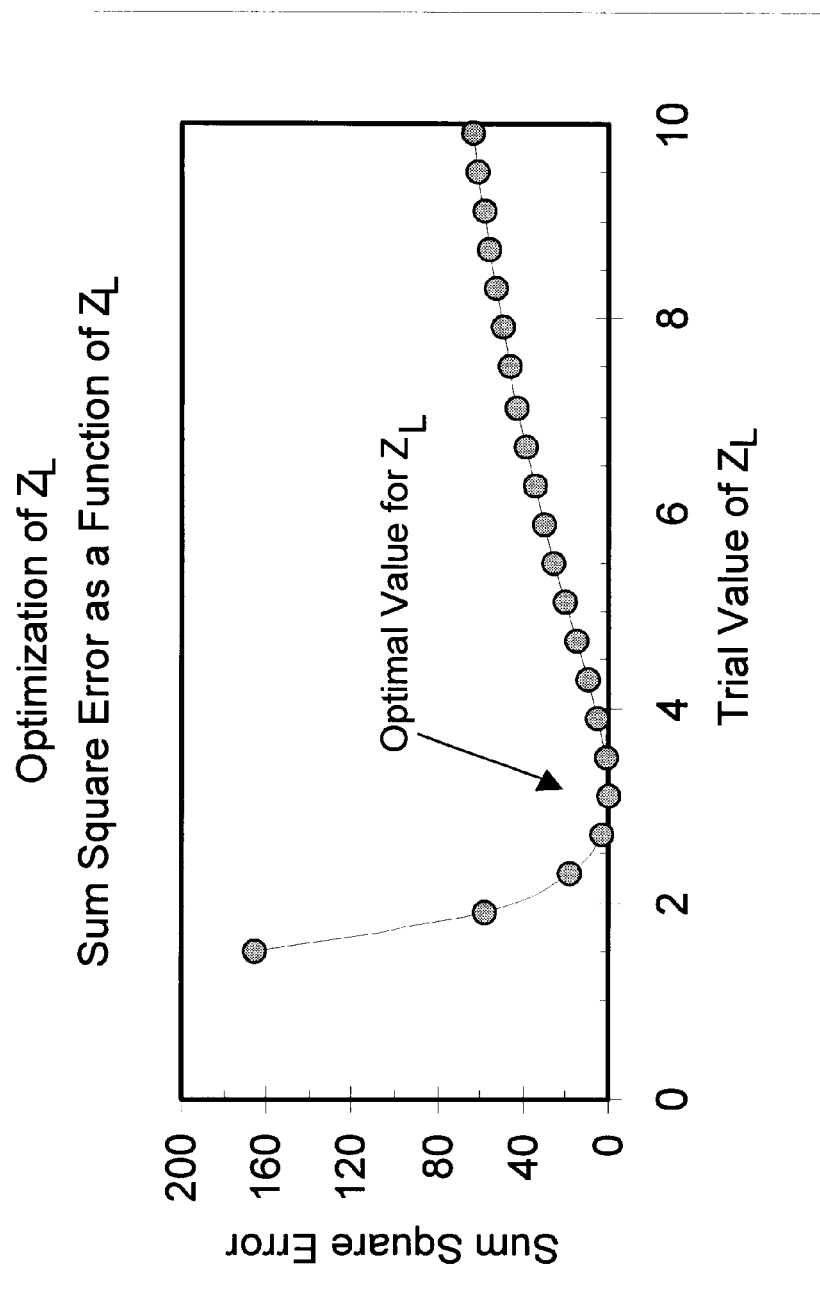
FIG. 7 illustrates the relationship between a sum squared error in measured position of a target as a function of the constant $Z_L$ according to the present invention.
Figure 8:
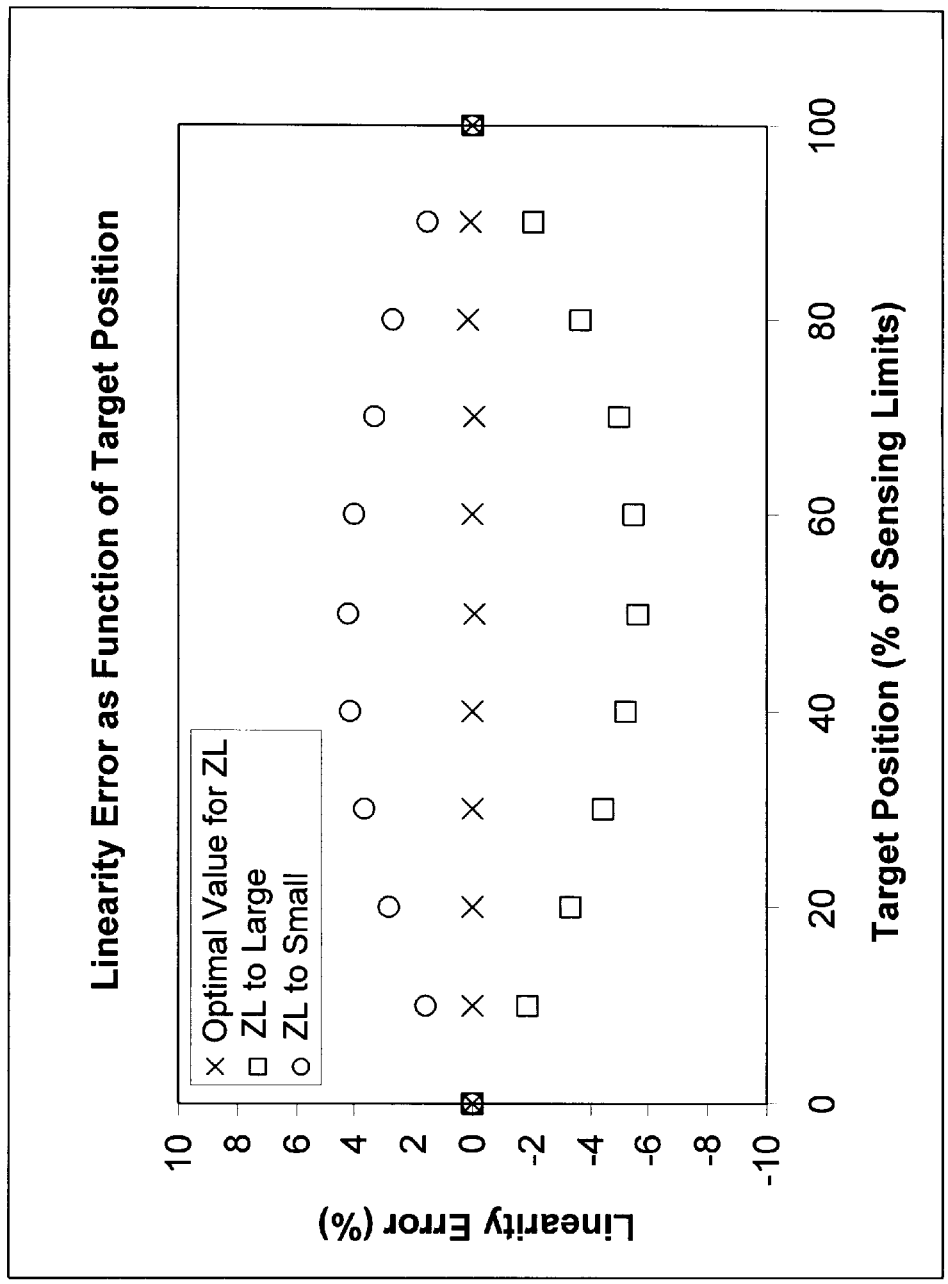
FIG. 8 illustrates the relationship between a linearity error in measured position of a target as a function of the target position between the near and far sensing limits according to the present invention.

FIG. 7 illustrates the shape of the error function from the data in Table 1, for a range of $Z_L$. As shown, there is one value of $Z_L$ that minimizes the linearity error. The linearity error, as a function of the target position, for three values of $Z^*_L$ is shown in FIG. 8. For the data shown in FIG. 8, the linearity error is shown for the optimal value of $Z_L$ (reference FIG. 7) as well as a value larger and a value smaller than the optimum.

As shown in FIGS. 7 and 8, the shape of the sum-square error function and linearity error makes is straightforward to determine the optimal value of $Z_L$. As previously stated, the behavior of the linearity minimization function is due to the unique nature of the transfer functions defined by Equations 16 and 17. This allows for easy linearization within a manufacturing setting—compensating for any number of factors that may be introduced during the assembly process.

Analog Output Transfer Function w/DAC Conditioning Terms

The characteristics of the transfer functions used as part of the present invention allow the operation of the output functions of a digital-to-analog converter (DAC) to be incorporated directly into the calculations used in determining the output of the transfer function. This incorporation of the DAC conditioning terms into the transfer function allows for the simplification of the DAC circuitry.

Figure 9:
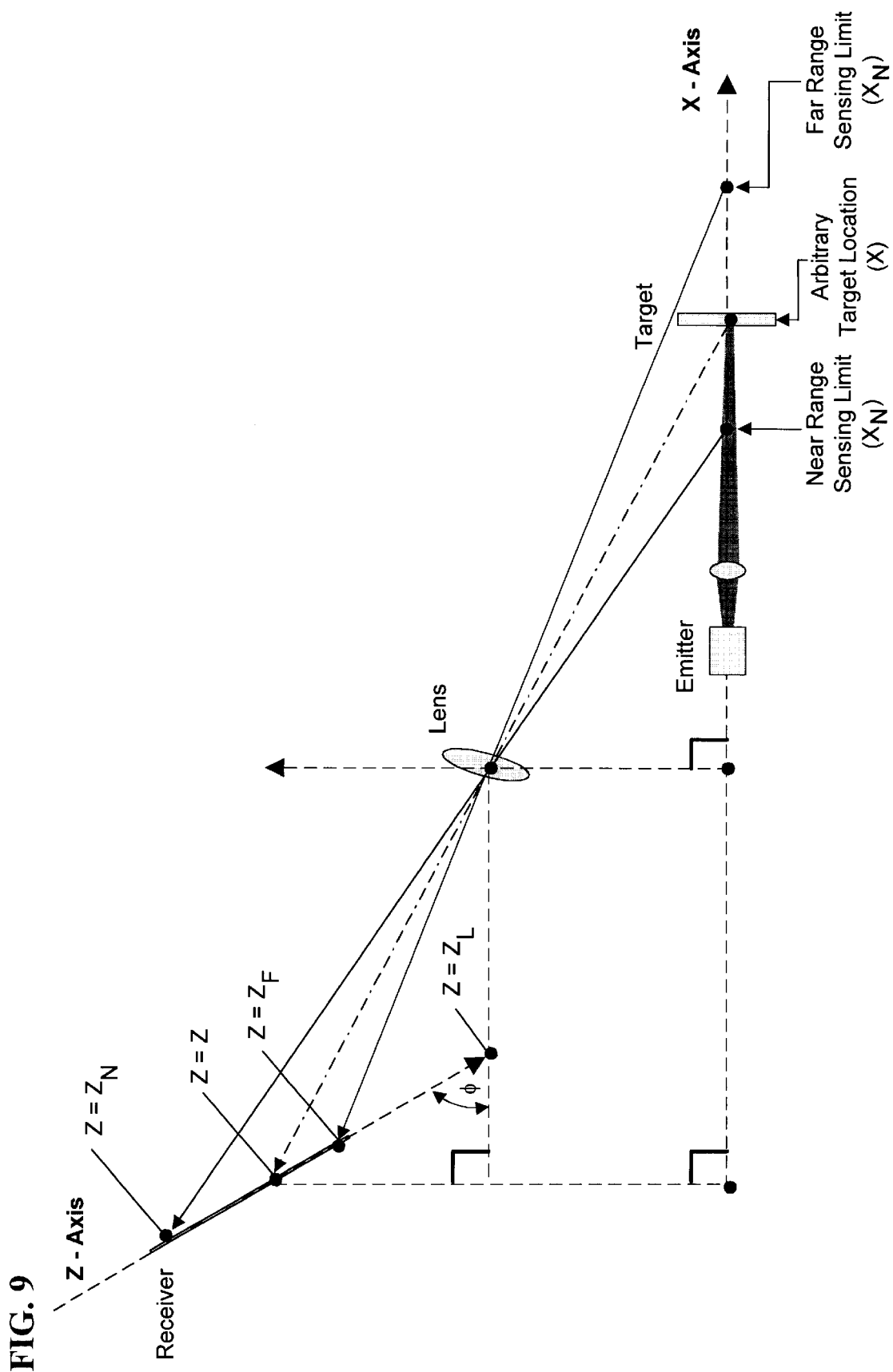
FIG. 9 illustrates the geometry utilized by an object displacement measurement system which utilizes trangulation principles according to another embodiment of the present invention.
Figure 10:
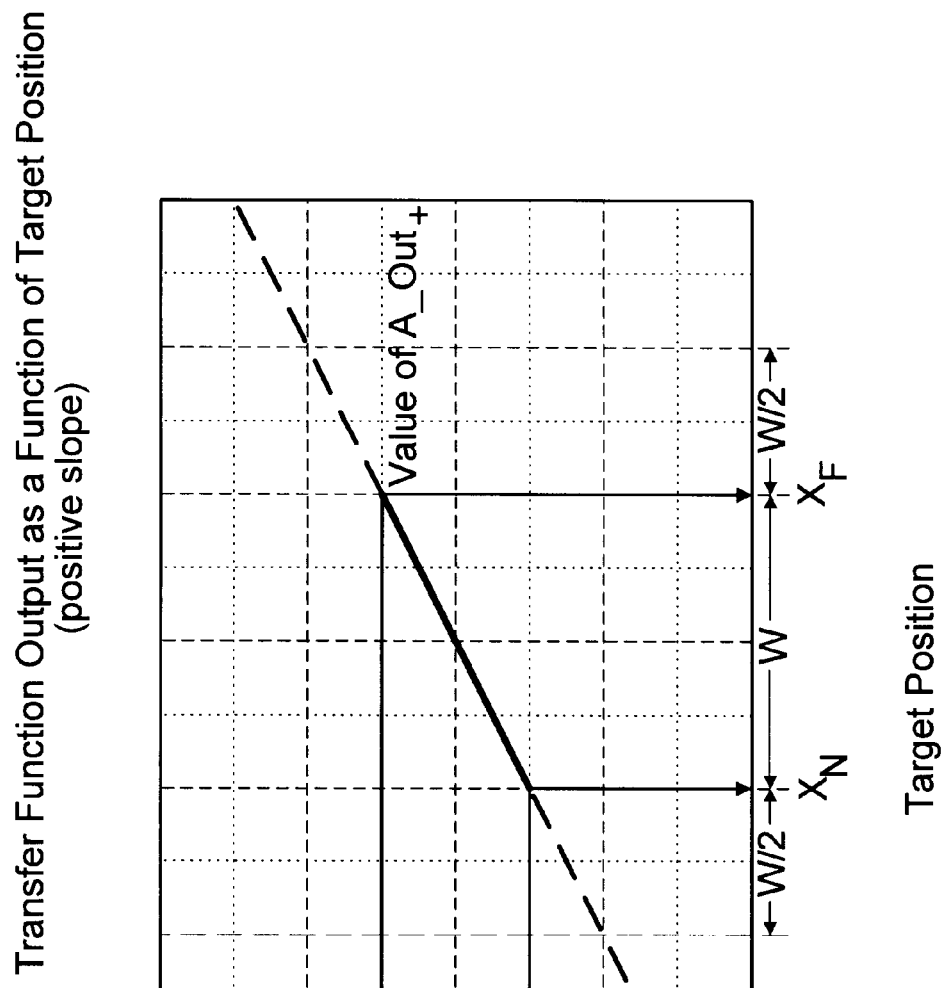
FIG. 10 illustrates the relationship between a transfer function having a positive slop as a function of the target position between the near and far sensing limits according to the present invention.

FIG. 9 illustrates a basic geometry for a triangulation sensor with an arbitrary angle on the receiver. For this illustration, define the following constants:

X=arbitrary location on the x-axis, 901

$X_N$=near window limit position (target), 902

$X_F$=far window limit position (target), 903

W=width of the sensing window in the X direction (the value=($X_F$−$X_N$).

Z=measured position in the Z-direction corresponding to a given position (X) on the x-axis, 910

$Z_L$=point of intersection between the plane of the PSD and the lens axis, 911

$Z_N$=measured position on the receiving element for the near window limit position ($X_N$), 912

$Z_F$=measured position on the receiving element for the far window limit position ($X_F$), 913

The transfer function whose output is from 0 to 1 over the near and far sensing window limits, respectively, is given by $$A\_Out_+ = \frac{\frac{1}{(Z - Z_L)} - \frac{1}{(Z_N - Z_L)}}{\frac{1}{(Z_F - Z_L)} - \frac{1}{(Z_N - Z_L)}}. \quad \text{Equation 19}$$

The transfer function whose output is from 1 to 0 over the near and far sensing window limits, respectively, is given by $$A\_Out_- = \frac{\frac{1}{(Z_F - Z_L)} - \frac{1}{(Z - Z_L)}}{\frac{1}{(Z_F - Z_L)} - \frac{1}{(Z_N - Z_L)}}. \quad \text{Equation 20}$$

To provide an analog output for the sensor, the value of the transfer function must be conditioned. In one particular embodiment of the present invention, the transfer function output must be scaled to an integer value that is transmitted to a Digital to Analog Converter:

$$\text{DAC\_Out}_+ = (A\_Out_+) \times (\text{Scaling Factor}) \quad \text{Equation 21}$$

and $$\text{DAC\_Out}_- = (A\_Out_-) \times (\text{Scaling Factor}) \quad \text{Equation 22}$$

In one particular embodiment, the A-to-D converter provides a 16 bit resolution. If the DAC is configured for one particular embodiment in such a way that a "0" provided an output of 4 mA and a "65535" provided an output of 20 mA, the scaling factor consists of a single constant with the output DAC controlling the scaling on the output value. Specifically, the scaling factor has been $2^{16}$ so the output of DAC_Out would range from 0 to 65535 (for A_Out ranging from 0 to 1). In other words, the scaling factor determines how many bits the transfer function changes over the range of the sensing window limits.

In some cases, it is desirable to have the analog output track outside the user defined sensing window limits (outside $X_N$ and $X_F$) but still provide the full range analog output (4–20 mA) within the sensing window limits. This requires running the DAC in a mode that provides a 0 to 24 mA output for an input range from 0 to 65536. Therefor, Equations 21 and 22 must be modified with a more complex scaling factor. Also, it is necessary that the transfer functions (Equations 19 and 20) be valid beyond the near and far sensing window limits. This is indeed the case equations 19 and 20 are valid outside of the sensing window limits. This relationship is shown graphically in FIG. 11.

Therefore, to accommodate the extra scaling requirements, Equations 21 and 22 take on the following form:

$$DAC\_Out_+ = (A\_Out_+) \times (I_{max} - I_{min}) + I_{min} \quad \text{Equation 23}$$

and $$DAC\_Out_- = (A\_Out_-) \times (I_{max} - I_{min}) + I_{min} \quad \text{Equation 24}$$

for the positive and negative output slopes, respectively.

Substituting the values for $A\_Out_+$ (Equation 22) into Equation 23 leads to:

$$DAC\_Out_+ = \left[\frac{1}{(Z - Z_L)} - C1\right] \times (C2) + C3 \quad \text{Equation 25}$$

where $$C1 = \left[\frac{1}{(Z_N - Z_L)}\right],$$

$$C2 = \left[\frac{1}{(Z_F - Z_L)} - \frac{1}{(Z_N - Z_L)}\right]^{-1} \times (Imax - Imin),$$

and $$C3 = I_{min}.$$

Similarly, for the negative going slope (Equations 21 & 24) the analog output transfer function becomes:

$$AC\_Out_- = \left[C4 - \frac{1}{(Z - Z_L)}\right] \times (C2) + C3 \quad \text{Equation 26}$$

where $$C4 = \left[\frac{1}{(Z_F - Z_L)}\right]$$

and C2 and C3 are defined as in Equation 25.

Providing a Fixed Sensing Window Width for a Given Mid-point Value

Another feature that is of interest is to have the transfer function provide analog output over a fixed sensing window having an arbitrary center position. For example, a user may want to teach a sensor the desired mid-point for the sensing window having the sensor automatically setting up a nominal sensing window about that position. Several new constants are needed to accomplish this.

$Z_{mid}$=Mid range normalized position $Z_{Wmin}$=low limit normalized position for desired window size $Z_{Wmax}$=upper limit normalized position for desired window size $I_{offset}$=Offset value (integer) to center the output about the sensing window midpoint $I_{min}$=Lower analog output trim constant $I_{max}$=Upper analog output trim constant During the factory calibration, the sensor must store a $Z_{Wmin}$, and a $Z_{Wmax}$ for the desired window size. For example, if a 5 mm window span is desired, the sensor must store any set of $Z_{Wmin}$ and $Z_{Wmax}$ that correspond to 5 mm. When the user "teaches" the mid-range sensing window the value of $I_{offset}$ must be calculated by the following manner.

The sensor must reassign the window limits to the values $Z_{Wmin}$ and $Z_{Wmax}$. The analog output then becomes (for the case of a positive slope):

$$DAC\_OUT_{mid+} = \left[\frac{1}{(Z_{mid} - Z_L)} - C1\right] \times (C2) + C3 \quad \text{Equation 27}$$

where $$C1 = \left[\frac{1}{(Z_{Wmin} - Z_L)}\right]$$

$$C2 = \left[\frac{1}{(Z_{Wmax} - Z_L)} - \frac{1}{(Z_{Wmin} - Z_L)}\right]^{-1} \times (Imax - Imin)$$

and $$C3 = I_{min}.$$

However, the value of the DAC output would not, in general, be the midpoint sensing window value. Therefore, a modification must be done to Equation 27 to facilitate this. Equation 27 then takes on this form:

$$DAC\_OUT_{mid+} = \left[\frac{1}{(Z_{mid} - Z_L)} - C1\right] \times \quad \text{Equation 28}$$
$$(C2) + C3 + I_{offset+}.$$

Since $DAC\_OUT_{mid}$ should equal, The mid point of the analog output, the appropriate value for the $I_{offset+}$ can be calculated $$\left[\frac{1}{(Z_{mid} - Z_L)} - C1\right] \times (C2) + C3 + I_{offset+} = \left[\frac{I_{min} + I_{max}}{2}\right], \quad \text{Equation 29}$$

therefore, $$I_{offset+} = \left[\frac{I_{min} + I_{max}}{2}\right] - \left[\frac{1}{(Z_{mid} - Z_L)} - C1\right] \times (C2) - C3. \quad \text{Equation 30}$$

Therefore, in the case where the the, user requires a well defined mid-point, the following transfer function can be used:

$$DAC\_OUT_+ = \left[\frac{1}{(Z - Z_L)} - C1\right] \times \quad \text{Equation 31}$$
$$(C2) + C3 + I_{offset+},$$

where $$C1 = \left[\frac{1}{(Z_{Wmin} - Z_L)}\right]$$

$$C2 = \left[\frac{1}{(Z_{Wmax} - Z_L)} - \frac{1}{(Z_{Wmin} - Z_L)}\right]^{-1} \times (Imax - Imin)$$

$$C3 = I_{min},$$

and $I_{offset+}$ is defined by Equation 30.

Similarly, if a negative slope is desired, the transfer function takes on the following form:

$$DAC\_OUT_- = \left[C4 - \frac{1}{(Z - Z_L)}\right] \times \quad \text{Equation 32}$$
$$(C2) + C3 + I_{offset-},$$

-continued where $$C4 = \left[\frac{1}{(Z_{Wmax} - Z_L)}\right]$$

$$C2 = \left[\frac{1}{(Z_{Wmax} - Z_L)} - \frac{1}{(Z_{Wmin} - Z_L)}\right]^{-1} \times (Imax - Imin)$$

$$C3 = I_{min},$$

and $I_{offset-}$ is defined by the Equation 35.

$$I_{offset-} = \left[\frac{I_{min} + I_{max}}{2}\right] - \left[C4 - \frac{1}{(Z_{mid} - Z_L)}\right] \times (C2) - C3. \qquad \text{Equation 33}$$

Figure 11:
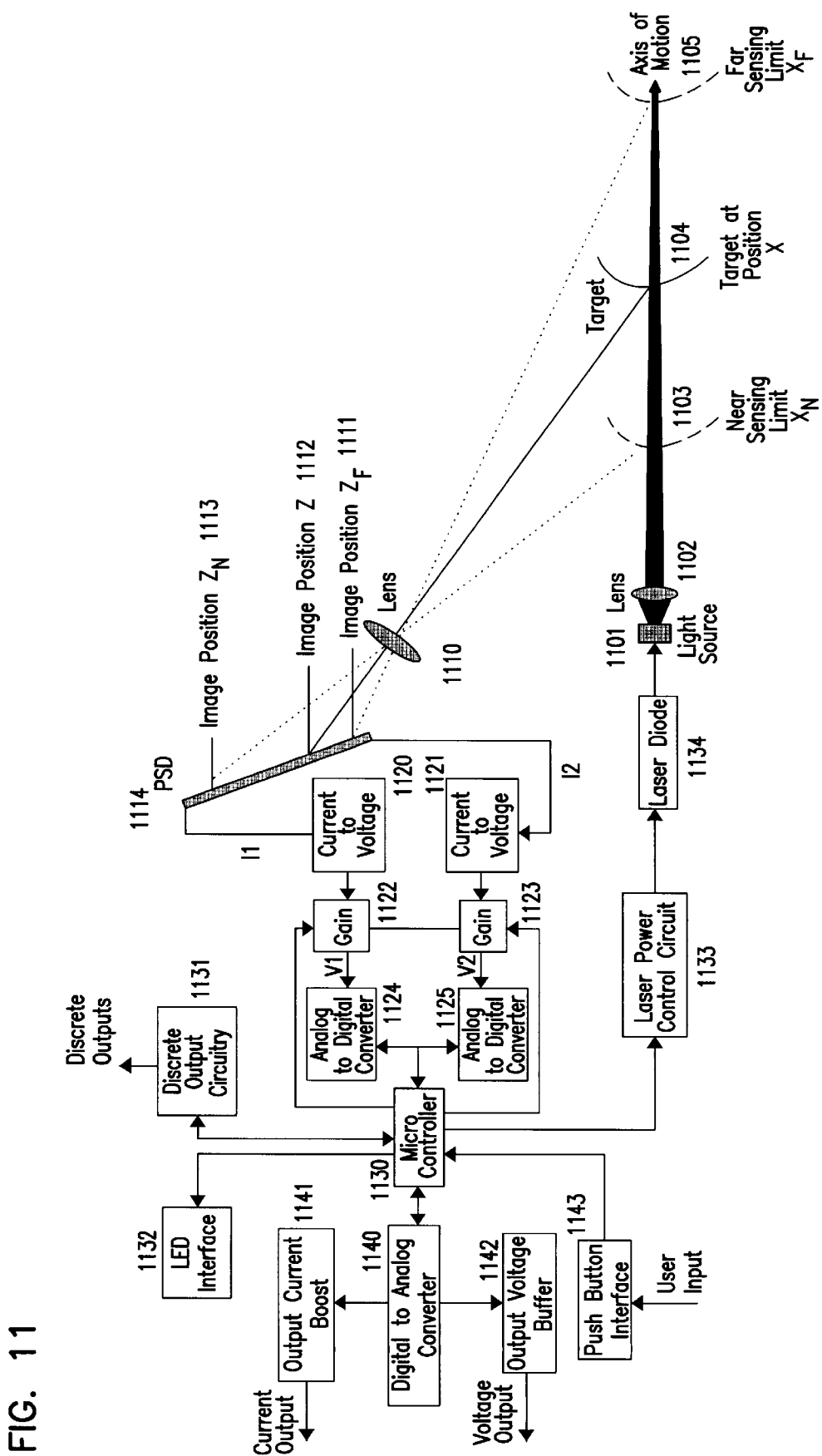
FIG. 11 illustrates a functional block diagram of an object displacement measurement system which utilizes trangulation principles according to another embodiment of the present invention.

FIG. 11 illustrates a functional block diagram of an object displacement system according to an example embodiment of the present invention. The system generates a beam of light generated by a light source 1101 which is focused by a lens 1102 onto a target object. The object is located at a position X 1104 which is between a near sensing limit 1103 and a far sensing limit 1105. The light beam is scattered by the target with a portion of the scattered light being received and focused by a receiving lens 1110 onto a PSD 1114. The image of the target on the PSD 1114 will be located at an image position Z 1112 between image position Zn 1113 and image position Zf 1111 which correspond to the image positions for the near and far sensing limits respectively.

Each end of the PSD device is read into a first current to voltage converter 1120 and second current to voltage converter 1121 respectively. These voltages correspond to the position of the target image relative to each end of the PSD in the Z axis. The output from the first and second converters 1120 and 1121 are amplified by a first and second gain circuit 1122 and 1123 respectively to generate a first and second position signal, which are identified as V1 1126 and V2 1127 respectively. These two voltage signals are then sampled by a first and second A-to-D converter 1124 and 1125.

The digital representations of the position signals V1 1126 and V2 1127 are read by a conventional microcontroller 1130. The microcontroller 1130 uses these position signals to calculate the target displacement using the transfer functions discussed above. The microcontroller 1130 also interfaces with various user interface devices such as a push button interface 1143, an LED interface 1132, and discrete output circuitry 1131. The microcontroller 1130 also controls the operation of the light source 1101 by commanding a laser power control circuit 1133 which itself controls the operation of a laser diode 1134.

In this example embodiment of the present invention, the microcontroller 1130 interfaces with a D-to-A converter 1140 which generates an output voltage signal and an output current signal using an output voltage buffer circuit 1140 and output current boost circuit 1141 respectively. These output signals represent the target position 1104 between the near and far sensing limits 1103 and 1105 as discussed above. Of course, the microcontroller 1130 can easily be interfaced with a large number of digital and analog recording devices as well as an equally large number of digital communication devices to output the digital representation of the target position 1104 for use by a larger system without deviating from the spirit and scope of the present invention.

Figure 12:
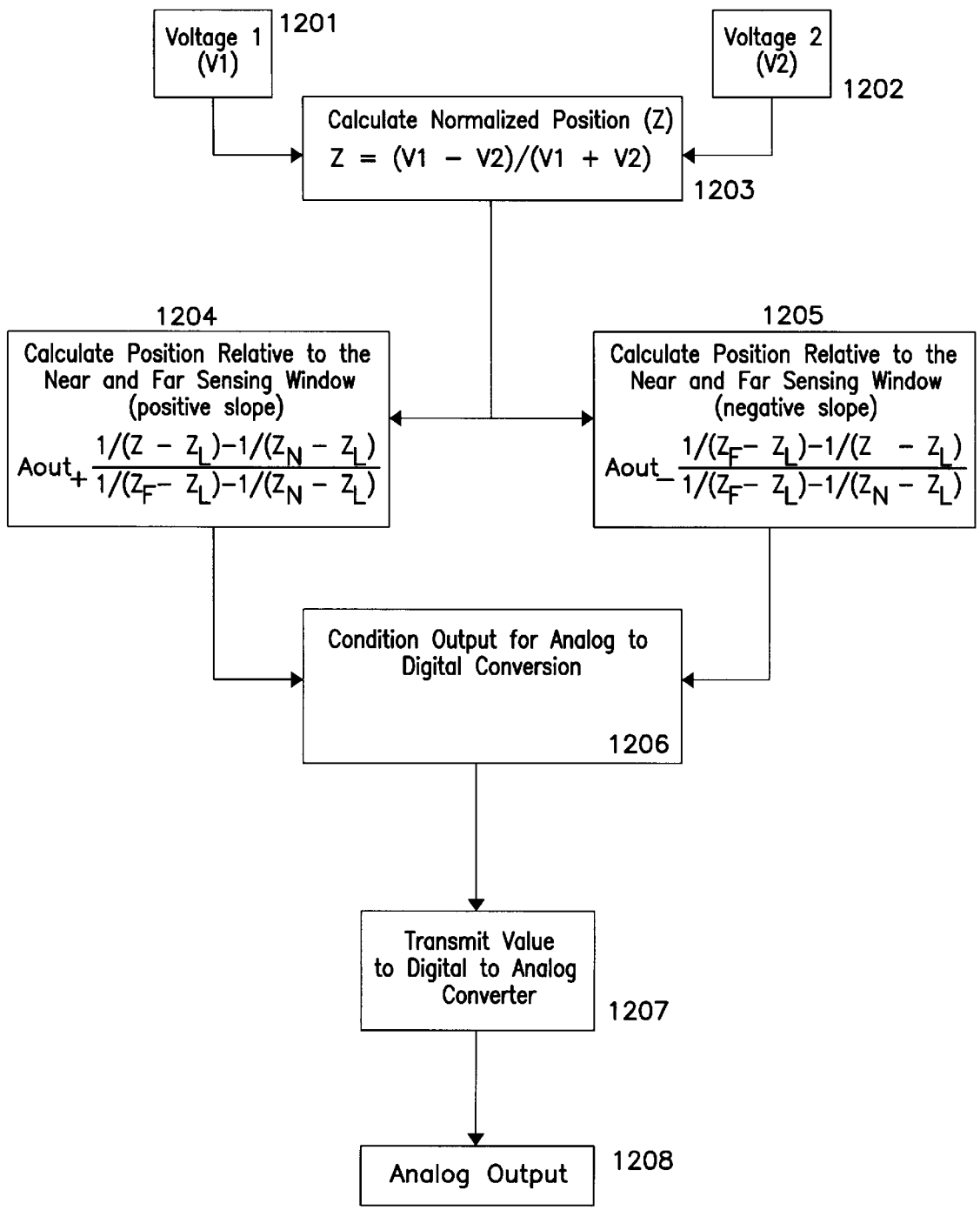
FIG. 12 illustrates a flowchart for the processing performed within an object displacement measurement system which utilizes trangulation principles according to another embodiment of the present invention.

FIG. 12 illustrates a flowchart for an example embodiment of the processing systems performed by the microcontroller 1130 in determining the target position 1104 according to the present invention. The microcontroller reads in the digital representations of the two position signals V1 1126 and V2 1127 in steps 1201 and 1202. These two values are used to calculate a normalized position Z in step 1203.

The normalized position is used to calculate the target position relative to the near and far sensing limits in steps 1204 and 1205 using the transfer function having a positive and negative slope respectively. These position values are then adjusted to condition the output value for output by a D-to-A converter in step 1206. The condition value is transmitted to the D-to-A converter in step 1207 for output in step 1208.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An optical distance sensing system for use in calculating the position of a target relative to arbitrary near and far window limits, the optical distance sensing system comprising:

a light source generating a light beam directed towards a target;

a photoelectric receiver comprising a receiver array and a lens and being configured to receive light generated by the light source after being scattered off of the target, the receiver generating a position signal indicating a location on the receiver array in which the received light is received; and a data processor being configured to receive the position signal from the receiver to generate a measured target position signal relative to a user defined minimum sensing distance and a user defined maximum sensing distance.

2. The optical distance sensing system according to claim 1, wherein the measured target position signal has a numeric value of zero corresponding to the target position equal to the user defined minimum sensing distance.

3. The optical distance sensing system according to claim 2, wherein the measured target position signal has a numeric value of one corresponding to the target position equal to the user defined maximum sensing distance.

4. The optical distance sensing system according to claim 1, wherein the linear transfer function has a positive going slope and is defined by the equation:

$$Aout = [1/(Z - Z_L) - 1/(Z_N - Z_L)]/[1/(Z_F - Z_L) - 1/(Z_N - Z_L)]$$

where

Aout = the calculated linear, normalized target position;

Z = a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the user defined maximum sensing distance; and $Z_N$=a numerical variable representing a second measured position on the receiving array corresponding to the user defined minimum sensing distance.

5. The optical distance sensing system according to claim 1, wherein the measured target position signal has a numeric value of one corresponding to the target displacement equal to the user defined minimum sensing distance.

6. The optical distance sensing system according to claim 5, wherein the measured target position signal has a numeric value of zero corresponding to the target displacement equal to the user defined maximum sensing distance.

7. The optical distance sensing system according to claim 1, wherein the linear transfer function has a negative going slope and is defined by the equation:

$$A\text{out}=[1/(Z_F-Z_L)-1/(Z-Z_L)]/[1/(Z_F-Z_L)-1/(Z_N-Z_L)]$$

where

Aout=calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the user defined maximum sensing distance; and $Z_N$=a numerical variable representing a second measured position on the receiving array corresponding to the user defined minimum sensing distance.

8. The optical distance sensing system according to claim 1, wherein the sensing system further comprises:

a target position signal circuit being configured to receive the measured target position signal from the data processor to generate an output signal proportional to the user defined minimum sensing distance and user defined maximum sensing distance.

9. The optimal distance sensing system according to claim 8, wherein the output signal is an electrical current, the minimum output value being 4 milliamperes, and the maximum out value being 20 milliamperes.

10. The optical distance sensing system according to claim 9, wherein the output signal is an electrical voltage.

11. The optical distance sensing system according to claim 9, wherein the output signal is a digital representation of the target position relative to the user defined minimum sensing distance and the user defined maximum sensing distance.

12. The optical distance sensing system according to claim 9, wherein the light source comprises a light emitting diode generating a pulse modulated light beam.

13. The optical distance sensing system according to claim 1, wherein the linear transfer function uses a single input variable for optimizing the linearity of the transfer function between the user defined minimum sensing distance and the user defined maximum sensing distance.

14. (New) The optical distance sensing system according to claim 4, wherein the numeric constant $Z_L$ has been optimized for linearity of the transfer function Aout.

15. The optical distance sensing system according to claim 7, wherein the numeric constant $Z_L$ has been optimized for linearity of the transfer function Aout.

16. An optical distance sensing system for use in calculating the position of a target relative to a user minimum sening distance and a user defined maximum sensing distance, the optical distance sensing system comprising:

a light source means for generating a light beam directed towards a target;

a photoelectric receiving light generated by the light source after being scattered off of the target, the receiver generating a position signal indicating a location on the receiver array in which the received light is received; and a data processor means receiving the position signal from the receiver to generate a measured target position signal using a linear transfer function;

wherein the linear transfer function uses a single input variable.

17. The optical distance sensing system according to claim 16, wherein the measured target position signal has a numeric value of zero corresponding to the target displacement equal to the user defined minimum sensing.

18. The optical distance sensing system according to claim 17, wherein the measured target position signal has a numeric value of one corresponding to the target displacement equal to the user defined maximum sensing distance.

19. The optical distance sensing system according to claim 16, wherein the linear transfer function having a positive going slope is defined by the equation:

$$A\text{out}=[1/(Z-Z_L)-1/(Z_N-Z_L)]/[1/(Z_F-Z_L)-1/(Z_N-Z_L)]$$

where

Aout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the user defined maximum sensing distance; and $Z_N$=a numerical variable representing a second measured position on the receiving array corresponding to the user defined minimum sensing distance.

20. The optical distance sensing system according to claim 16, wherein the measured target position signal has a numeric value of one corresponding to the target displacement equal to the user defined minimum sensing distance.

21. The optical distance sensing system according to claim 20, wherein the measured target position signal has a numeric value of zero corresponding to the target displacement equal to the user defined maximum sensing distance.

22. The optical distance sensing system according to claim 16, wherein the linear transfer function has a positive going slope and is defined by the equation:

$$A\text{out}=[1/(Z_F-Z_L)-1/(Z-Z_L)]/[1/(Z_F-Z_L)-1/(Z_N-Z_L)]$$

where

Aout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the user defined maximum sensing distance; and $Z_N$=a numerical variable representing a second measured position on the receiving array corresponding to the user defined minimum sensing distance.

23. The optical distance sensing system according to claims 22, wherein the output signal is an electrical current, the minimum output value being 4 milliamperes, and the maximum output value being 20 milliamperes.

24. The optical distance sensing system according to claim 22, wherein the output signal is an electrical voltage.

25. The optical distance sensing system according to claim 22, wherein the output signal is a digital representation of the distance.

26. The optical distance sensing system for use in locating the displacement of a target relative to a fixed sized sensing window having a window mid-point and a window width, the optical distance sensing system comprising:

a light source generating a light beam directed towards a target;

a photoelectric receiver comprising a receiver array and a lens and being configured to receive light generated by the light source after being scattered off of the target, the receiver generating a position signal indicating a location on the receiver array in which the received light is received;

a data processor being configured to receive the position signal from the receiver to generate a measured target displacement signal using a linear transfer function; and a target displacement signal circuit being configured to receive the measured target displacement signal from the data processor to generate an output signal, DACout;

wherein the linear transfer function uses a single input variable, the window mid-point, and the window width.

27. The optical distance sensing system according to claim 26, wherein the linear transfer function has a positive going slope and is defined by the equation:

$$DACout=[1/(Z-Z_L)-1/(Z_{Wmin}-Z_L)]/[1(Z_{Wmax}-Z_L)-1/(Z_{Wmin}-Z_L)]^* [I_{max}-I_{min}]+I_{offset}$$

where

DACout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_{Wmax}$=a numerical variable representing a upper limit normalized position on the receiving array corresponding to the user defined maximum sensing distance of the window width;

$Z_{Wmin}$=a numerical constant representing a lower limit normalized position on the receiving array corresponding to user defined minimum sensing distance of the window width;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

28. The optical distance sensing system according to claim 26, wherein the linear transfer function having a negative going slope is defined by the equation:

$$DACout=[1/(Z_{Wmax}-Z_L)-1/(Z-Z_L)]/[1/(Z_{Wmax}-Z_L)-1/(Z_{Wmin}-Z_L)]^* [I_{max}-I_{min}]+I_{offset}$$

where

DACout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_{Wmax}$=a numerical variable representing a upper limit normalized position on the receiving array corresponding to the user defined maximum sensing distance of the window width;

$Z_{Wmin}$=a numerical constant representing a lower limit normalized position on the receiving array corresponding to user defined minimum sensing distance of the window width;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

29. The optical distance sensing system according to claim 26, wherein the output signal is an electrical voltage.

30. The optical distance sensing system according to claim 26, wherein the output signal is a digital representation of the distance.

31. The optimal distance sensing system according to claim 26, wherein the output signal is an electrical current, the minimum output value being 4 milliamperes, and the maximum out value being 20 milliamperes.

32. The optical distance sensing system according to claim 29, wherein the light source comprises a light emitting diode generating a pulse modulated light beam.

33. An optical distance sensing system for use is locating the displacement of a target relative to a fixed sized sensing window having a window mid-point and a window width, the optical distance sensing system comprising:

a light source means for generating a light beam directed towards a target;

a photoelectric receiver means for receiving light generated by the light source means after being scattered off of the target, the receiver means generates a position signal indicating a location on the receiver array in which the received light is received;

a data processor means for receiving the position signal from the receiver and generating a measured target displacement signal using a linear transfer function; and a target position signal circuit means receiving the measured target position signal from the data processor and generating an output signal, DACout;

wherein the linear transfer function uses a single input variable, the window mid-point, and the window width.

34. The optical distance sensing system according to claim 33, wherein the linear transfer function has a positive going slope and is defined by the equation:

$$DACout=[1/(Z-Z_L)-1/(Z_{Wmin}-Z_L)]/[1/(Z_{Wmax}-Z_L)-1/(Z_{Wmin}-Z_L)]^* [I_{max}-I_{min}]+I_{offset}$$

where

DACout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_{Wmax}$=a numerical variable representing a upper limit normalized position on the receiving array corresponding to the user defined maximum sensing distance of the window width;

$Z_{Wmin}$=a numerical constant representing a lower limit normalized position on the receiving array corresponding to user defined minimum sensing distance of the window width;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

35. The optical distance sensing system according to claim 33, wherein the linear transfer function has a negative going slope and is defined by the equation:

$$DACout=[1/(Z_{Wmax}-Z_L)-1/(Z-Z_L)]/[1/(Z_{Wmax}-Z_L)-1(Z_{Wmin}-Z_L)]*[I_{max}-I_{min}]+I_{offset}$$

where

DACout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_{Wmax}$=a numerical variable representing a upper limit normalized position on the receiving array corresponding to the user defined maximum sensing distance of the window width;

$Z_{Wmin}$=a numerical constant representing a lower limit normalized position on the receiving array corresponding to user defined minimum sensing distance of the window width;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

36. The optical distance sensing system according to claim 33, wherein the output signal comprises is an electrical voltage.

37. The optical distance sensing system according to claim 33, wherein the output signal is a digital representation of the distance.

38. The optimal distance sensing system according to claim 33, wherein the output signal is an electrical current, the minimum output value being 4 milliamperes, and the maximum out value being 20 milliamperes.

39. The optical distance sensing system according to claim 36, wherein the light source comprises a light emitting diode generating a pulse modulated light beam.

40. A method of locating the displacement of a target between a user specified minimum position and a user specified maximum position using an optical distance sensing system, the method comprising:

directing a light bean toward the target;

positioning a photoelectric receiver array in the path of light scattered from the target for generating a displacement signal according to the position of the scattered light on the photoelectric receiver array; and processing the displacement signal to determine the position of the target between the user specified minimum position and the user specified maximum position using a linear transfer function;

wherein the linear transfer function uses a single input variable.

41. The method according to claim 40, wherein the linear transfer function has a positive going slope and is defined by the equation:

$$Aout=[1/(Z-Z_L)-1/(Z_N-Z_L)]/[1/(Z_F-Z_L)-1/(Z_N-Z_L)]$$

where

Aout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the maximum displacement; and $Z_N$=a numerical variable representing a second measured position on the receiving array corresponding to the minimum displacement.

42. The method according to claim 40, wherein the linear transfer function having a positive going slope is defined by the equation:

$$Aout=[1/(Z_F-Z_L)-1/(Z-Z_L)]/[1/(Z_F-Z_L)-1/(Z_N-Z_L)]$$

where

Aout=the calculated linear, normalized target position;

Z=a measured position in a Z-direction on the photoelectric receiver corresponding to a given target position;

$Z_L$=a numerical constant representing a point of intersection between the plane of the receiver array and an axis of the receiving lens;

$Z_F$=a numerical variable representing a first measured position on the receiving array corresponding to the maximum displacement; and $Z_N$=a numerical variable representing a second measured position on the receiving array corresponding to the minimum displaement.

43. A method of locating a displacement of a target between a user specified minimum window position and a user specified maximum window position using an optical distance sensing system, the method comprising:

locating a target at a first position corresponding to the user specified minimum window position;

directing a light bean toward the target;

positioning a photoelectric receiver array in the path of light reflected from the target for generating a minimum position signal according to the position of the reflected light on the photoelectric receiver array;

locating the target at a second position corresponding to the user specified maximum window position;

directing the light bean toward the target;

positioning the photoelectric receiver array in the path of light reflected from the target for generating a maximum position signal according to the position of the reflected light on the photoelectric receiver array;

processing the minimum and maximum position signals to determine a lower limit normalized displacement constant, $Z_{Wmin}$, and a upper limit normalized constant of the target, $Z_{Wmin}$, using a linear transfer function; directing a light bean toward the target;

directing the light bean toward the target located at an unknown position;

positioning the photoelectric receiver array in the path of light reflected from the target for generating a position signal according to the position of the reflected light on the photoelectric receiver array;

processing the position signal to determine the position of the target using a linear transfer function; and wherein the linear transfer function uses a single input variable, the window mid-point, and the window width.

44. The method according to claim 43, wherein the linear transfer function has a positive going slope and is defined by the equation:

$$DACout=[1/(Z-Z_L)-1/(Z_{Wmin}-Z_L)]/[1/(Z_{Wmax}-Z_L)-1/(Z_{Wmin}-Z_L)]*[I_{max}-I_{min}]+I_{offset}$$

where

DACAout=the calculated linear, normalized target position;

Z=a measured position in a Z-direction on the photoelectric receiver corresponding to a given target position;

$Z_L$=a numerical constant representing a point of intersection between the plane of the receiver array and an axis of a receiving lens;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

45. The method according to claim 40, wherein the linear transfer function has a negative going slope and is defined by the equation:

$$DACout=[1/(Z_{Wmax}-Z_L)-1/(Z-Z_L)]/[1/(Z_{Wmax}-Z_L)-1/(Z_{Wmin}-Z_L)]*[I_{max}-I_{min}]+I_{offset}$$

where

DAC_out=the calculated linear, normalized target position;

Z=a measured position in a Z-direction on the photoelectric receiver corresponding to a given displacement distance;

$Z_L$=a numerical constant representing a point of intersection between the plane of the receiver array and an axis of a receiving lens;

$I_{min}$=a numerical constant representing a lower analog output trim constant;

$I_{max}$=a numerical constant representing a upper analog output trim constant;

$I_{offset}$=a numerical constant representing an analog output offset constant configured to center the fixed size sensing window at the window mid-point.

\* \* \* \* \*

UNITED STATES PATENT AND TRADEMARK OFFICE
CERTIFICATE OF CORRECTION

PATENT NO. : 6,122,039
DATED : September 19, 2000
INVENTOR(S) : Schumacher

It is certified that error appears in the above-identified patent and that said Letters Patent is hereby corrected as shown below:

Title page,
ABSTRACT, line 1, "A" should read -- An --
Line 3, delete "a"; it should read -- between near and far --

Column 2,
Line 17, "it's" should read -- its --
Line 40, "affects" should read -- effects --
Line 49, delete "an"
Line 54, delete "a"
Line 67, insert -- a -- before "look up table"

Column 3,
Line 30, "can easily be measured"; should read -- can easily be measured", in --
Line 39, insert -- to -- between "respect" and "the"
Line 54, "an" should read -- a --
Line 55, "relative to a near" should read -- relative to user configurable near --

Column 4,
Line 20, "limit." should read -- limits. --

Column 5,
Line 6, "slop" should read -- slope --
Line 33, "was" should read -- were --
Line 64, "a" should read -- an --

Column 6,
Line 28, "targets" should read -- target's --
Line 61, insert -- be -- between "readily" and "optimized"

Column 7,
Line 67, "φ" should read -- ø --

Column 8,
Line 12, "targets" should read -- target's --
Line 30, insert -- is -- before "at"

UNITED STATES PATENT AND TRADEMARK OFFICE
CERTIFICATE OF CORRECTION

PATENT NO. : 6,122,039
DATED : September 19, 2000
INVENTOR(S) : Schumacher

It is certified that error appears in the above-identified patent and that said Letters Patent is hereby corrected as shown below:

Column 9,
Line 10, delete "is"
Line 19, "sealed" should read -- scaled --

Column 14,
Line 29, "should equal, The mid point" should read -- should equal the mid point --
Line 41, delete second "the,"; it should read -- where the user requires --

Column 17,
Line 23, "Aout=calculated linear," should read -- Aout=the calculated linear, --

Column 18,
Line 7, insert -- receiver means for -- after the word "photoelectric"

Column 19,
Line 5, "claims" should read -- claim --
Line 22, "generating" should read -- generates --

Column 20,
Line 39, "is" should read -- in --
Line 54, insert -- for -- after "means"

Column 22,
Line 1, "bean" should read -- beam --
Line 50, "displaement." should read -- displacement. --
Line 57, "bean" should read -- beam --
Line 64, "bean" should read -- beam --

Column 23,
Line 7, "bean" should read -- beam --
Line 8, "bean" should read -- beam --
Line 26, "DACAout" should read -- DACout --
Line 29, "target position" should read -- displacement distance --

UNITED STATES PATENT AND TRADEMARK OFFICE
CERTIFICATE OF CORRECTION

PATENT NO. : 6,122,039
DATED : September 19, 2000
INVENTOR(S) : Schumacher

It is certified that error appears in the above-identified patent and that said Letters Patent is hereby corrected as shown below:

<u>Column 24,</u>
Line 16, "DAC_out=the" should read -- DACout=the --

Signed and Sealed this

Twenty-third Day of April, 2002

JAMES E. ROGAN
*Director of the United States Patent and Trademark Office*

*Attest:*

*Attesting Officer*